United States Patent [19]
Lloyd

[11] Patent Number: 5,801,891
[45] Date of Patent: Sep. 1, 1998

[54] FLAT MIRROR MOUNTING FLEXURE

[75] Inventor: Carl A. Lloyd, Bloomfield, N.Y.

[73] Assignee: Eastman Kodak Company, Rochester, N.Y.

[21] Appl. No.: 834,063

[22] Filed: Apr. 14, 1997

[51] Int. Cl.$^6$ .............................. G02B 7/182; A47F 7/14
[52] U.S. Cl. .......................... 359/871; 248/475.1
[58] Field of Search ........................ 359/819, 820, 359/871; 248/466, 475.1, 603

[56] References Cited

U.S. PATENT DOCUMENTS

| | | | |
|---|---|---|---|
| 4,850,674 | 7/1989 | Hasselskog | 359/820 |
| 5,313,333 | 5/1994 | O'Brien et al. | 352/820 |
| 5,383,168 | 1/1995 | O'Brien et al. | 369/44.14 |
| 5,526,193 | 6/1996 | Anzai | 359/819 |
| 5,532,882 | 7/1996 | Lamper et al. | 359/819 |
| 5,550,669 | 8/1996 | Patel | 359/224 |

FOREIGN PATENT DOCUMENTS 61-275709  12/1986  Japan .

OTHER PUBLICATIONS

Dynamics Research Corp., Wilmington, MA 01887, printed ad for Hollow Shaft Rotary Encoders,*Machine Design*, Jan. 16, 1997, p. 19.

*Primary Examiner*—Paul M. Dzierzynski
*Assistant Examiner*—Mark A. Robinson
*Attorney, Agent, or Firm*—Thomas H. Close

[57] ABSTRACT

A flexure structure for mounting an element such as a mirror in an optical device to a frame such as a telescope support structure includes a flexure blade defining a fork having three coplanar tines. A first mounting pad is located on the center tine for attaching the flexure blade to the mirror. A pair of mounting feet are located on the outside tines for attaching the flexure blade to the frame. The relative sizes of the tines being such that zero moment is applied to the mirror by the flexure structure when the mirror is displaced relative to the frame.

7 Claims, 3 Drawing Sheets

FLAT MIRROR MOUNTING FLEXURE

FIELD OF THE INVENTION

The invention relates generally to the field of precision instruments, and in particular to mounting structures for mounting elements in precision instruments. More specifically, the invention relates to a flexure mounting structure useful for mounting a mirror element in a telescope.

BACKGROUND OF THE INVENTION

Referring to FIG. 1, in a prior art configuration for mounting an element such as a rectangular mirror 10 in a frame 12, three blade flexures 14, 16, and 18 are employed. The blade flexures are elements designed to be stiff in the vertical direction and in the translation direction parallel to the mirror edge, and in the rotation direction normal to the edges to which it is attached. The other degrees of freedom (bending about the parallel direction, translation normal to the mounting edge, and rotation about the vertical axis) are intentionally "soft" (less stiffness). This type of mounting structure, providing constraint of rigid body motion is called a "kinematic mount". In this way, the mirror 10 is free to expand or contract in the horizontal and vertical directions with respect to the frame 12, but is stiffly restrained from rigid body motions in all degrees of freedom, thus maintaining alignment and providing a relatively high first vibration mode frequency.

In this prior art example, the blade flexures 14, 16, and 18 are attached to the mirror 10 by means of an adhesive (RTV) which is injected into a gap 20 between the flexure and the mirror through holes 22 in the ends of the flexure blades while the mirror 10 is held in an aligned position by a fixture (not shown). During the cure, the adhesive shrinks to some extent thereby inducing some stress in the mirror due to a bending moment which is a function of the bending and lateral stiffness of the mirror end of the flexure and the stiffness and amount of cure shrinkage which is developed by the adhesive. The bending moment on the mirror may distort the optical figure (shape) of the mirror, thereby degrading the optical performance of the instrument. Additionally, after the flexures are attached to the mirror it may be necessary to release the flexures from the frame to relieve the accumulated stress to reattach the flexures to the frame with potting compound. This extra step is costly and time consuming.

There is a need therefore for an improved mounting structure for mounting elements such as mirrors in frames.

SUMMARY OF THE INVENTION

The present invention is directed to overcoming one or more of the problems set forth above. In addressing these considerations, a unique flexure design has been developed which can be designed to provide an attachment pad area for the adhesive bond which does not rotate as a function of translation as the adhesive shrinks. At the same time the stiffness in the translation direction is very low compared to a typical design with the same vertical direction stiffness. Briefly summarized, according to one aspect of the present invention, a flexure structure for mounting an element such as a mirror in an optical device to a frame such as a telescope support structure includes a flexure blade defining a fork having three coplanar tines. A first mounting pad is located on the center tine for attaching the flexure blade to the mirror. A pair of mounting feet are located on the outside tines for attaching the flexure blade to the frame. The relative sizes of the tines being such that zero moment is applied to the mirror by the flexure structure when the mirror is displaced relative to the frame.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of mounting the element such that relative motion between the element and the frame does not induce a moment in the element. It has the further advantages of being relatively compact and allows the element to be mounted within the frame, thereby providing a delicate element with a degree of protection.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
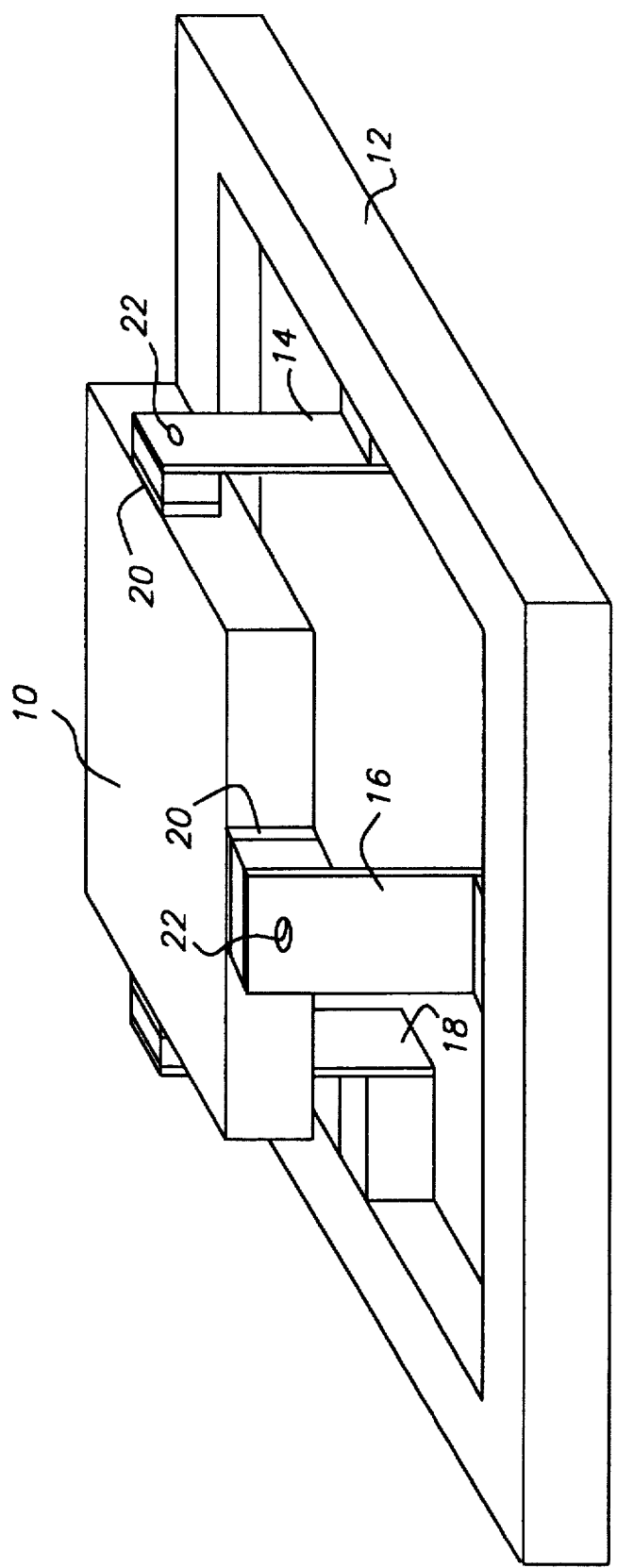
FIG. 1 is a perspective view showing a prior art flexure mirror mounting structure.
Figure 3:
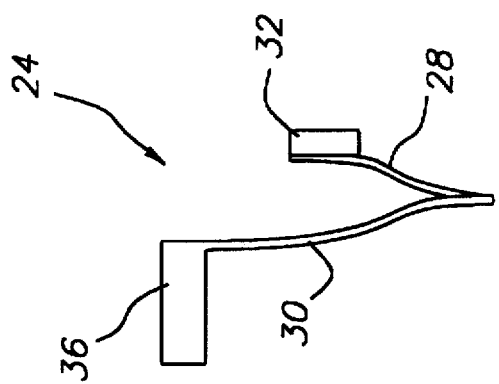
FIG. 3 is a side view of the flexure shown in FIG. 2, shown in a displaced condition.
Figure 2:
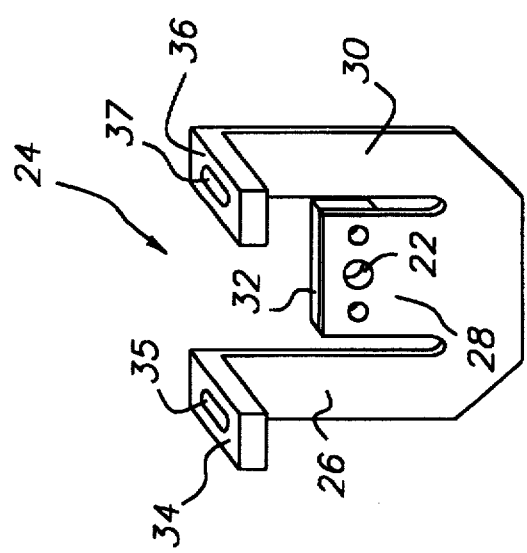
FIG. 2 is a perspective view of a flexure according to the present invention.

Referring to FIG. 2, a flexure blade 24 according to the present invention utilizes "double back" approach in which the flexure blade is split into three coplanar tines 26, 28 and 30. A mounting pad 32 is located on the center tine 28 for mounting the flexure blade 24 to an element such as a mirror. A pair of mounting feet 34 and 36 are provided on the outside tines 26 and 30 respectively for mounting the flexure blade 24 to a frame. The use of the "double back" design increases the effective length of the flexure blade for bending stiffness reduction, and allows the mounting pad 32 to translate without rotating when the respective sizes of the tines are chosen appropriately. By using this design to mount a flat mirror, it is possible to eliminate bending stresses that would be developed due to differential thermal expansions between the mirror and the frame, and to cure shrinkage of the adhesive employed to attach the flexure blade to the mirror. The stresses due to lateral stiffness of the flexure are then restricted to membrane forces and do not bend the mirror out of plane, whereby the rms wavefront (optical figure) of the mirror surface is unaffected. As shown in FIG. 3, when the pad 32 of flexure blade 24 is displaced relative to the mounting feet 34, 36 in a direction normal to the plane of the flexure blade, the pad 32 is not subject to rotation.

The relative sizes of the tines 26, 28, and 30 of flexure blade 24 that will produce zero moment on mounting pad 32 are determined by using a finite element model. A titanium flexure blade according to the present invention was designed for mounting a 2" by 4" by ½ thick flat glass mirror in an invar frame, using the finite element analysis program NASTRAN™, available from the McNeal Schwindler Corporation, Long Beach, Calif. For a given thickness, e.g. 30 mils, the lengths and widths of the tines were adjusted within specified spatial constraints to provide zero rotation at the mounting pad 32 while providing minimal lateral flexural stiffness. The dimensions were adjusted manually and the structure modeled until the desired performance was achieved. In the resulting structure the center tine was 0.5" by 0.104" and the outer tines were 0.25" by 0.781".

Figure 4:
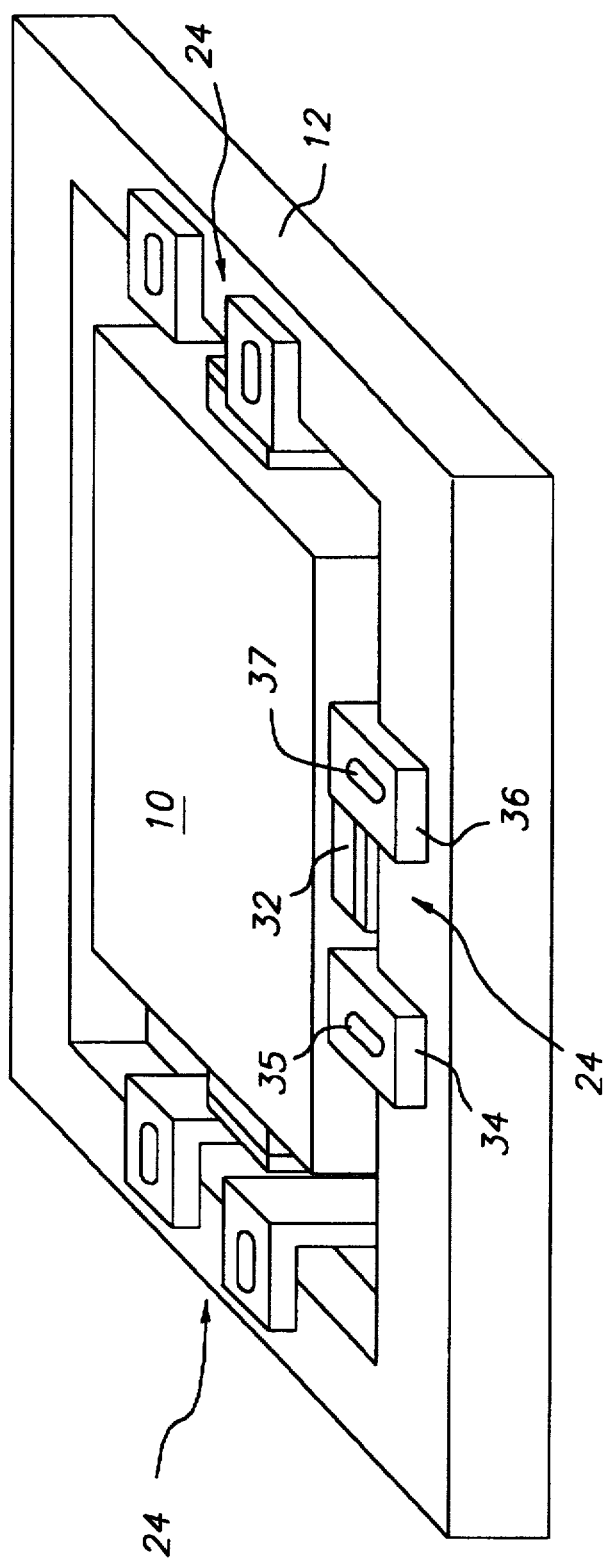
FIG. 4 is a perspective view of a mirror mounting structure similar to FIG. 1, employing the flexure mounting structure according to the present invention.

Referring to FIG. 4, a mirror 10 mounted in a frame 12 using the flexures 24 according to the present invention is shown. The structure is assembled by first attaching the flexures 24 to the frame 12 with screws through elongated holes 35 and 37 in feet 34 and 36 respectively. The positions of the flexures 24 are adjusted to present a desired potting gap between pads 32 and the edges of mirror 10, which is held temporarily in place by a fixture(not shown) and the screws are secured in the elongated holes with epoxy. After the adhesive is cured the fixture is removed. It is not necessary to provide any further adjustments to the mounting structure as was required in the prior art.

The subject flexure design is intended for supporting a mirror, lens, solid state image sensor, or any other component which must be isolated from the effects of adhesive cure shrinkage and thermal mismatch between the component and the supporting structure.

The invention has been described with reference to a preferred embodiment. However, it will be appreciated that variations and modifications can be effected by a person of ordinary skill in the art without departing from the scope of the invention. For example, the center tine of the flexure blade may be attached to the frame, while the outer tines are attached to the mirror. Furthermore, more than three tines may be employed, for example 5 or 7 etc.

PARTS LIST 10 mirror
12 frame
14 flexure
16 flexure
18 flexure
20 gap
22 hole
24 flexure blade
26 tine
28 tine
30 tine
32 mounting pad
34 mounting foot
35 elongated hole
36 mounting foot
37 elongated hole

What is claimed is:

1. A flexure structure for mounting an element to a frame, comprising:
   a) a flexure blade defining a fork having three coplanar tines;
   b) first mounting means located on a center tine for attaching the flexure blade between the frame and the element;
   c) second mounting means located on outside tines for attaching the flexure blade between the frame and the element;
   d) the relative sizes of the tines being such that zero moment is applied to the element by the flexure structure when the element is displaced relative to the frame.

2. The flexure structure claimed in claim 1, wherein the flexure blade is titanium.

3. The flexure structure claimed in claim 1, wherein the mounting means located on the center tine is a pad adapted to be attached to the element by an adhesive and the mounting means located on the outside tines is a pair of feet arranged perpendicularly to the plane of the flexure blade, one foot on each tine, each foot defining a hole and adapted to be attached to the frame by screws.

4. The flexure structure claimed in claim 3, wherein the holes in the feet are elongated in a direction normal to the blade to allow adjustment of the position of the flexure structure relative to the frame during attachment of the flexure structure to the element.

5. The flexure structure claimed in claim 1, wherein the element is a rectangular mirror, the frame surrounds the element, and wherein the flexure structure is attached between one edge of the rectangular mirror and one side of the frame, and further comprising:
   a) a second flexure structure similar to said flexure structure attached between the opposite edge of the mirror and the frame; and
   b) a third flexure structure similar to the first flexure structure attached between an adjacent edge of the mirror and the frame.

6. The flexure structure claimed in claim 1, wherein the element is a mirror.

7. The flexure structure claimed in claim 1, wherein the element is a solid state image sensor.

* * * * *